United States Patent [19]

Annemaier et al.

[11] Patent Number: 6,010,763
[45] Date of Patent: *Jan. 4, 2000

[54] FIREPROOFING MATERIAL

[75] Inventors: Dieter Annemaier, Illerkirchberg; Robert Graf, Altenstadt, both of Germany

[73] Assignee: Grunau Illertissen, Illertissen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/532,692

[22] PCT Filed: Apr. 2, 1994

[86] PCT No.: PCT/EP94/01032

§ 371 Date: Jan. 17, 1996

§ 102(e) Date: Jan. 17, 1996

[87] PCT Pub. No.: WO94/24226

PCT Pub. Date: Oct. 27, 1994

[30] Foreign Application Priority Data

Apr. 9, 1993 [DE] Germany .............................. 43 11 794

[51] Int. Cl.⁷ .............................. B32B 1/06; C09K 21/00
[52] U.S. Cl. .............................. 428/76; 428/71; 428/74; 428/323; 428/304.4; 428/920; 428/921; 252/606
[58] Field of Search .................................. 428/71, 74, 76, 428/323, 920, 921, 304.4, 305.5, 313.7, 316.6, 317.9; 523/179; 252/606; 52/232

[56] References Cited

U.S. PATENT DOCUMENTS

| 4,168,175 | 9/1979 | Shutt | 106/15.05 |
|---|---|---|---|
| 4,191,675 | 3/1980 | Inagaki et al | 260/29.3 |
| 4,225,649 | 9/1980 | Peterson | 428/383 |
| 4,273,879 | 6/1981 | Langer et al. | 521/91 |
| 4,579,592 | 4/1986 | Loomis | 106/18.11 |
| 4,816,312 | 3/1989 | Annemaier et al. | 428/74 |
| 5,047,449 | 9/1991 | Pastureau | 523/179 |

FOREIGN PATENT DOCUMENTS

| 0293531 | 12/1988 | European Pat. Off. . |
| 0347309 | 12/1989 | European Pat. Off. . |
| 3536625 | 4/1987 | Germany . |
| 4007060 | 9/1991 | Germany . |

*Primary Examiner*—Marie Yamnitzky
*Attorney, Agent, or Firm*—Ernest G. Szoke; Wayne C. Jaeschke; Glenn E. J. Murphy

[57] ABSTRACT

A fireproofing material is provided in the form of a loose mixture comprising:

a. at least one heat-insulating material which is heat resistant at temperatures of up to 1100° C., b. at least one swelling agent active at elevated temperatures, c. at least one binder active at elevated temperatures, and d. at least one flexibly compliant constituent, wherein the mixture is free from inorganic fibers. The mixture is typically contained in a sealed flexible bag. The flexibly compliant constituent is typically a granular foam or a fiber conglomerate. The flexibly compliant constituent is present in the mixture in quantities of 1 to 30% by weight and preferably 2 to 15% by weight.

25 Claims, No Drawings

FIREPROOFING MATERIAL

BACKGROUND OF THE INVENTION

1. Field of the Invention

This invention relates to a fireproofing material in the form of a loose mixture, more particularly in a sealed flexible bag, containing a. at least one heat-insulating material which is heat-resistant at temperatures of up to 1100° C., b. at least one swelling agent heat-activated at elevated temperatures, c. at least one binder heat-activated at elevated temperatures.

2. Discussion of Related Art

One such fireproofing material is described in applicant's DE-A1-35 36 625 and has good heat insulating and expansion properties.

The fireproofing material known from this document normally contains a very high percentage of inorganic fibers, such as ceramic fibers and mineral fibers. Fibers such as these are no longer desirable on account of possible carcinogenic properties, even when the fireproofing material is contained in a bag. However, attempts to reduce the percentage of fibers and to use larger quantities of other insulating materials instead have revealed certain disadvantages, such as an increased tendency to flow and poor impermeability to smoke.

Accordingly, the problem addressed by the present invention was to avoid the potential danger of inorganic, more particularly mineral, fibers and nevertheless to obtain good fireproof properties.

SUMMARY OF THE INVENTION

The invention is characterized in that the fireproofing material is free from inorganic fibers and contains at least one flexibly compliant constituent.

DETAILED DESCRIPTION OF THE INVENTION

The high fiber content of known fireproofing materials provided the mixture of individual constituents with a certain internal structure which, in the event of fire, remained intact over substantially the entire temperature range and, at temperatures above the sintering and melting range of the fibers, was replaced by the binding property which those materials then developed. These highly desirable properties of the fibers are now no longer necessary through the absence of inorganic fibers.

It has been found that the resistance of the fibers to heat, although desirable, is not essential. Numerous fire tests have shown that adapted mechanical properties of the mixture of the fireproofing material not only determine its handling and functioning at normal temperatures, they also favorably influence the behavior of the mixture in the event of fire. Thus, it has been found that the at least one flexibly compliant constituent in the mixture is capable of counteracting the tendency of individual constituents to flow, preventing separation, enabling the fireproofing material to be accommodated in an impermeable manner, even when it is packed in small bags, and simultaneously establishing the impermeability of the fireproofing material to smoke through the creation of extended flow paths (labyrinth principle), even when the binder and swelling agent have not developed their effects adequately, if at all, at low temperatures. It has also been found that the flexibly compliant constituent does not have to be particularly heat-resistant. Even when the structure of the flexibly compliant constituents is destroyed in the event of fire, this does not lead to disintegration or collapse of the fireproofing mixture. This is attributable to the fact that the swelling agent and binder are activated at temperatures which the flexibly compliant material no longer withstands and provide for cohesion of the mixture. By virtue of the good heat-insulating effect of the fireproofing material, the mixture is present in unchanged native or only partly modified form with its structure intact immediately behind the layer of fireproofing material affected by heat, so that the favorable mechanical properties remain fully intact.

The fireproofing material according to the invention advantageously consists solely of weather-resistant and moisture-resistant constituents. Depending on the application envisaged, it need only contain one swelling agent or only one binder. However, mixtures of swelling agents and mixtures of binders are preferred because it is possible with mixtures to initiate activation in a continuous or graduated manner substantially uniformly over the entire temperature range occurring in the event of fire. The swelling agent or rather the mixture of swelling agents may be present in quantities of 20 to 60% by weight and, more particularly, 25 to 55% by weight. The swelling effect preferably begins at the latest at temperatures of around 200° C. and, more particularly, at temperatures of around 150° C. and advantageously extends to temperatures of up to 1100° C. The binder may be present in quantities of 6 to 25% by weight and is normally present in quantities of more than 10% by weight and, more particularly, in quantities of 10% by weight. The binder is advantageously activated at the latest at temperatures of 200° C. and, more particularly, at temperatures of 100° C. or earlier, the binder properties advantageously being active over the entire temperature range occurring in the event of fire, i.e. at least up to 900° C. and preferably up to 1100° C. and higher.

It has surprisingly been found that, both at normal temperature and in the event of fire, properties which compensate the basically desirable properties of glass and mineral fibers are produced in the mixture through the combination of a swelling effect developed very early with a binder effect developed even earlier in conjunction with the constituent which is flexibly compliant at least at normal ambient temperature. Any tendency on the part of the heat-insulating material and a large percentage of the swelling agent to flow can be additionally counteracted by having constituents of the binder mixture develop their effect at the latest at temperatures of 200° C. and preferably at temperatures of 100° C. to establish a bond between the flowable constituents. A swelling effect which begins at temperatures as low as 200° C. and preferably 150° C. provides for an early increase in pressure within the fireproofing material which is accommodated either in the bags or in any other spatially confined container, such as a shaft or duct. The bond established by the binder is thus strengthened because the individual constituents of the mixture are pressed against one another. This is further supported by the fact that the flexibly compliant constituents which provide the mixture with volume and reduced permeability to gases provide the individual constituents of the mixture with cohesion at an early stage which makes the mixture impermeable, more particularly to smoke, even at the beginning of the swelling process.

The at least one flexibly compliant constituent preferably consists of organic materials, more particularly biological materials. These materials decompose at increasing temperatures of about 150° C. to 400° C. However, the graduated swelling agents have undergone such a large increase in volume at temperatures in this range that the loss of volume through decomposition of the flexibly compliant constituents is overcompensated, so that this loss can be accepted. The flexibly compliant constituents are preferably compressible. They are advantageously present in the form of particles. The flexible constituents are preferably present in the form of granules, more particularly with an uneven and, more particularly, rough surface. This uneven surface leads to increased friction within the mixture which reduces its tendency to separate and its flowability. At the same time, the danger of smoke penetrating is drastically reduced by the filling of voids. The compressible constituents preferably have an open-pore structure so that they are capable of at least partly absorbing fine-particle and, more particularly, powder-form constituents. The compressible constituents advantageously consist of foamed material, more particularly foam plastics. They may readily be obtained by irregular size reduction of relatively large pieces of foam. Examples of suitable foams are those of polyurethane, polyethylene, polypropylene and the like. The particle size of the compressible constituents is preferably from 0.5 mm to 10 mm and, more particularly, from 2 mm to 8 mm; an average size of 3 mm to 5 mm being of advantage.

The elastically compressible material may also consist of fibers which are not of inorganic composition. Fibers such as these include in particular fibers of biological origin, such as cellulose fibers, because they are relatively heat-resistant. However, the fibers may also consist of organic materials, for example may be synthetic fibers, and may simultaneously develop binder properties at relatively high temperatures. Mixtures of various fibers are also possible. The fibers are preferably present in the form of conglomerates, lumps or clusters, more particularly with an open surface, as described in the above-mentioned DE-A1 35 36 625, but with the crucial difference that, by virtue of their organic composition, they melt or rather burn even at moderately high temperatures and thus lose their desirable properties. By virtue of the binding, swelling and heat-insulating effect of the other components, this property surprisingly has no effect on the fireproof properties, even in quantities of up to 30% by weight. Several flexibly compliant constituents may even be present in the form of a mixture, for example in the form of a mixture of foam granules and fiber conglomerates.

The heat-insulating constituents may be the known heat-insulating materials not including fibers. Suitable materials are, for example, powder-form and granular insulating materials, such as expanded perlite, expanded foamclay, kieselguhr, pumice, fly ash, preferably in granulated form, lava, gas concrete, broken bricks, gypsum, broken calcium silicate moldings and hollow glass beads. The particle size is in the known ranges from 0 mm to around 8 mm. Expanded perlite is one of the preferred insulating materials by virtue of its high heat resistance. Among the heat insulating materials, the so-called light fillers with their low specific gravities are preferred. The percentage content of heat-insulating constituents is advantageously from 20 to 50% by weight and, more particularly, from 25 to 45% by weight.

A swelling agent mixture contains at least two swelling agents active at two different temperature stages. Here, too, perlite—in unexpanded form as native pearlite—is preferred. Expanded graphite is also a preferred swelling agent because it expands at temperatures as low as 200° C. and higher. Unexpanded foamclay, which is active in a middle range between expanded graphite and native perlite, is another preferred swelling agent. Generally known organic swelling agents may also be used in addition to or instead of the expanded graphite. These include above all urea/formaldehyde resins and melamine/formaldehyde resins which also have binding properties. Combinations of ammonium polyphosphate/melamine phosphate/pentaerythritol are also a suitable swelling agent. The mixture of swelling agents is advantageously selected so that, in the event of fire, a substantially constant swelling effect is developed over the entire temperature range.

In the fireproofing material according to DE-A1 35 36 625, the heat-insulating material and/or the expanding material is/are present in the mixture in very large quantities of more than 90% by weight and, more particularly, more than 95% by weight. According to the invention, it has been found that good fireproof properties can also be obtained with a smaller percentage of these two materials. According to the invention, therefore, the percentage by weight of heat-insulating materials and/or expanding material is kept below 90% by weight and, more particularly, below 85% by weight, favorable results even being obtained with quantities of less than 80% by weight. This accommodates the particular property of perlite which, although preferred as a heat-insulating material and as an expanding swelling agent by virtue of its high heat resistance, does show an undesirably marked tendency to flow. To counteract the tendency of the fireproofing material to flow, the percentage content of binders is kept relatively high in accordance with the invention, preferably amounting to more than 10% by weight and, in particular, to more than 15% by weight. With regard to the relative percentages by weight, it is important to ensure that the heat-insulating material—which is preferably present in the form of light fillers—has a low apparent density (50 to 500 g per l). Accordingly, seemingly relatively small shifts in the percentages by weight in favor of the binders, of which the apparent densities are generally in the range from 300 to 1000 g per l, i.e. are considerably higher, result in fairly major changes in the ratios by volume. Suitable binders are any known binders for fireproofing materials, provision being made to ensure that a binding effect active over the entire temperature range from 100° C. to >800° C. in the event of fire is obtained. Binders which are active at lower temperatures of around 100° C. are, for example, thermoplastic powders, such as HDPE, EVAc, PA. If a binding effect below 100° C. is required, hotmelt adhesives or contact adhesives activated at temperatures below 100° C. may be used, for example in the form of dispersions, contact adhesives also acting as dust removers. Standard dust removers, such as mineral oil, may also be used in quantities of up to 5% by weight.

Binders for the middle temperature range are preferably borax, zinc borate, calcium borate and ammonium borate and the like. Binders for higher temperature ranges are suitable glasses in granular or powder form, such as in particular low-alkali glass which has a softening range of 700° C. to 800° C. The binder mixture is preferably formulated in such a way that, even after a fire when it has cooled down, the fireproofing material is present in bonded form, more particularly in a baked or sintered form. In this way, the fire protection obtained, for example an opening in masonry filled with fireproofing bags, largely withstands extinguishing work and also largely retains its fireproof properties on reheating in the event of redevelopment of the fire.

It has been found to be an advantage of the fireproofing material according to the invention that the fireproof properties are maintained not only in the event of increasing temperature, but also over prolonged periods at elevated temperature. This is attributable to the fact that the temperature level in the event of fire increases only slowly from outside to inside by virtue of the effective heat insulation, so that the temperature inside the mixture only rises gradually to a level where the swelling agents active at around 200° C. are activated whereas binders and swelling agents operating at a considerably higher temperature stage are already active in the layers facing the fire. This so-called zonal melting with a delay from outside to inside maintains the fireproofing effect of the mixture, even in the event of considerable variations in temperature, because native material is always present inside the mixture.

The fireproofing material according to the invention may also contain other typical constituents such as, for example, water-separating agents, more particularly hydrated aluminium oxides and the like. As already mentioned, the fireproofing material may be used in loose form, for example may be poured into irregular voids. In general, it is used in the form of packs in flexible bags, as known per se. The bags preferably consist of closely woven glass fiber cloth. Special coatings are thus unnecessary. The glass fibers are advantageously so thick that there is no danger of carcinogenic properties.

A particularly preferred fireproofing material contains 20 to 50% by weight and, more particularly, 25 to 45% by weight of heat-insulating fillers, more particularly light fillers, 20 to 60% by weight and, more particularly 25 to 55% by weight of swelling agents, 10 to 25% by weight and, more particularly, 10 to 20% by weight of binders, 5 to 20% by weight and, more particularly, 5 to 15% by weight of flexibly compliant constituents and, optionally, 1 to 5% by weight and, more particularly, 2 to 3% by weight of dust-removing agents and, optionally, other typical additives. Swelling agents may also have heat-insulating properties at least after swelling. Binders may also have swelling properties, for example when they decompose and foam at the same time.

Preferred embodiments of the invention are illustrated by the following Examples in conjunction with the subsidiary claims.

EXAMPLE 1

A tubular bag of glass fiber cloth 25 cm wide and 30 cm long is filled with a mixture of 45% by weight of expanded perlite (particle size 0–6 mm), 20% by weight of native perlite, 7% by weight of PUR foam flakes (particle size 2–7 mm), 3% by weight of ground PE foam (particle size 1–4 mm), 5% by weight of melamine/formaldehyde resin, 4% by weight of expanded graphite, 2% by weight of polyamide, 6% by weight of calcium borate, 5% by weight of low-alkali glass powder and 3% by weight of silicone oil to only such an extent that it can still readily be moulded by hand and several filled bags can be stacked flat one above the other with no danger of falling down. The mixing times in the production of the filling were short. Hardly any tendency to separate was noticeable during filling of the bags.

When placed in a cable bulkhead, the filled bags were found to show considerably improved compression and installation behavior (gussets present were relatively easy to fill). A fire test according to DIN 4102, part 9, was terminated after 110 minutes because the permitted temperatures of 180° C. above the starting temperature had not been reached anywhere on the cold side. A very slight passage of smoke between the cables was only observed in the first few minutes; smoke plumes from the bags were not visible.

When the bag was heated on one side to more than 100° C., the low-temperature binders polyamide and PE foam initially soften. The contents of the bag begin to expand at temperatures of only 200° C. In the event of a further increase in temperature, the substances also acting as binders, calcium borate and low-alkali glass powder, and—as a function of temperature—the expanded graphite and perlite acting as swelling agents are successively activated.

A mass which swells and binds and, hence, does not flow in any temperature zone is thus formed and can be used to seal openings in walls and ceilings.

EXAMPLE 2

A tubular bag 25 cm wide and 30 cm long is filled as described above with a mixture of 20% by weight of foamclay granules (particle size 0–8 mm), 10% by weight of lavagrus (particle size 0–4 mm), 12.5% by weight of expanded perlite, 20% by weight of cellulose fiber granules (particle size 3–7 mm), 3% by weight of ethylene/vinyl acetate powder, 5% by weight of ammonium pentaborate, 3% by weight of ammonium polyphosphate, 7.5% by weight of low-alkali glass powder, 7% by weight of melamine/formaldehyde resin, 3% by weight of expanded graphite, 8% by weight of native perlite and 1% by weight of mineral oil. In this case, too, the mixture was produced relatively quickly and cartons could be filled without any visible tendency towards separation.

When placed in a cable bulkhead the filled bags showed distinctly improved compression and installation behavior (gussets were relatively easy to fill).

Despite the high percentage content of combustible material, the permitted temperature on the cold side of the cable bulkhead was only reached in the 114th minute. No smoke was observed between the cables nor were there any visible smoke plumes from the bags.

When the bag was heated, the heat-insulating light fillers in the various temperature zones were successively bonded into a block by the substances acting as binders, namely ethylene/vinyl acetate powder, ammonium pentaborate, ammonium polyphosphate and low-alkali glass powder. At the same time, the volume of the heat-insulating block increases steadily as a function of temperature.

Finally, at temperatures above 900° C., the mixture begins to sinter into a rigid body of which the volume is greater than the starting volume.

EXAMPLE 3

A tubular bag of glass fiber cloth 25 cm wide and 35 cm long is filled as described above with a mixture of 25% by weight of expanded perlite (particle size 0–6 mm), 45% by weight of native perlite, 3% by weight of expanded graphite, 5% by weight of vermiculite, 2.5% by weight of HDPE powder, 5% by weight of zinc borate, 5% by weight of ammonium polyphosphate, 6.5% by weight of PUR foam flakes (particle size 2–7 mm) and 3% by weight of a 50% polyvinyl acetate/ethylene dispersion. The mixture is prepared in the same way as described in Example 1. In the production of the filling, the mixing times were considerably shorter. Hardly any tendency towards separation was visible during filling of the bags.

When placed in a cable bulkhead, the filled bags showed distinctly improved compression and installation behavior (gussets were relatively easy to fill).

The fire test revealed no smoke between the cables and only light smoke fumes on the cold side of the bags in the first few minutes. The permitted temperature according to DIN 4102, part 9, of 180° C. above the starting temperature was reached on the cold side in the 110th minute.

When the bag was heated, the heat-insulating light fillers in the various temperature zones were successively bonded into a block by the substances acting as binders, namely PVAc/ethylene, HDPE powder, zinc borate, ammonium polyphosphate. The PUR foam flakes serve as a sealing material between the rigid insulating granules of the light filler. The volume of the heat-insulating block increases steadily as a function of temperature through addition of the components acting as swelling agents, namely expanded graphite, vermiculite and perlite.

One feature common to all the Examples is that a number of swelling agents and binders is added to a heat-insulating material free from inorganic fibers in such a way that both permanent swelling and bonding by substances activated in various temperature zones and, finally, hardening at high temperatures are obtained. The function of the organic foams of PUR, PE, PP and the cellulose fiber granules is to provide the material with a certain affinity for compression on installation, resulting in greater impermeability to smoke.

EXAMPLE 4

A tubular bag of glass fiber cloth 25 cm wide and 35 cm long is filled as described above with a mixture of 24% by weight of expanded perlite (particle size 0–6 mm), 25% by weight of native perlite, 2.5% by weight of expanded graphite, 2.5% by weight of vermiculite, 5.5% by weight of ammonium polyphosphate, 6% by weight of calcium borate, 2% by weight of zinc borate, 6% by weight of PVAc/E dispersion, 1.5% by weight of PA powder and 25% by weight of chopped PE foam (particle size 2–8 mm). The mixture is prepared in the same way as described in Example 3 in regard to its separation tendency and affinity for installation in the bulkhead.

The fire test carried out in a 400×300 mm opening with 15 PVC cables (NYM 3×1.5 mm) in a right-of-way revealed an increase in temperature of 180 K on the cold side after only 102 minutes despite the high percentage content of combustible constituents. By contrast, the fire resistance times required for fire-resistant ceilings and walls in the Federal Republic of Germany are only 90 minutes, which means that a bulkhead of this type satisfies the fire protection requirements for buildings with ease. The bags again provided a very effective seal against the passage of smoke between bags and cables and through the contents of the bags (no visible smoke plumes).

The mixture bonds at temperatures of only 90° C. through the substances acting as binders, namely PA powder, PVAc/E dispersion and PE foam. At 180–200° C., the expanded graphite begins to increase the volume of the block. The substance acting as high-temperature binders, namely zinc borate, calcium borate and ammonium polyphosphate, are activated in the event of a further increase in temperature. The swelling agents, vermiculite and perlite, lead to temperature-graduated expansion of the mixture at 400 to 800° C. and at 1000 to 1200° C.

At no time can gaps be formed through burnable cable sheaths, in addition to which the formation of channels through which smoke can pass is effectively prevented by the use of the elastically compressible PE foam.

We claim:

1. A fireproofing material in the form of a loose mixture free from inorganic fibers, said loose mixture consisting essentially of:

a. at least one heat-insulating material which is heat resistant at temperatures of up to 1100° C.,
   b. at least one swelling agent active at a temperature of from about 150° C. up to about 1100° C.,
   c. at least one binder active at a temperature of from about 100° C. up to about 1100° C., and
   d. at least one flexibly compliant organic constituent in the form of a fiber conglomerate and/or a foam.

2. A fireproofing material as claimed in claim 1 wherein the flexibly compliant constituent has a particle size of 0.5 mm to 10 mm.

3. A fireproofing material as claimed in claim 1 wherein the flexibly compliant constituent has a particle size of 2 mm to 8 mm.

4. A fireproofing material as claimed in claim 1 wherein the flexibly compliant constituent is compressible.

5. A fireproofing material as claimed in claim 1 wherein the flexibly compliant constituent has an uneven surface.

6. A fireproofing material as claimed in claim 1 wherein the flexibly compliant constituent has a rough surface.

7. A fireproofing material as claimed in claim 1 wherein the flexibly compliant constituent is in granular form.

8. A fireproofing material as claimed claim 1 wherein the flexibly compliant constituent is a granular foam.

9. A fireproofing material as claimed in claim 1 wherein the flexibly compliant constituent is porous.

10. A fireproofing material as claimed in claim 1 wherein said swelling agent is a mixture of swelling agents formulated so that the mixture of swelling agents increases in volume substantially constantly beginning at temperatures of around 150° C.

11. A fireproofing material as claimed in claim 1 wherein said swelling agent is a mixture of swelling agents formulated so that the mixture of swelling agents increases in volume substantially constantly beginning at temperatures of around 200° C.

12. A fireproofing material as claimed in claim 1 wherein said binder is a mixture of binders formulated so that the mixture of binders is successively active at about 100° C. to at least 900° C.

13. A fireproofing article comprising a sealed flexible bag containing a loose mixture free from inorganic fibers, said loose mixture consisting essentially of:

a. at least one heat-insulating material which is heat resistant at temperatures of up to 1100° C.,
   b. at least one swelling agent active at a temperature of from about 150° C. up to about 1100° C.,
   c. at least one binder active at a temperature of from about 100° C. up to about 1100° C., and
   d. at least one flexibly compliant organic constituent present in the form of a fiber conglomerate and/or a foam.

14. A fireproofing article as claimed in claim 13 wherein said sealed flexible bag consists of woven glass fiber cloth.

15. A fireproofing article as claimed in claim 13 wherein the flexibly compliant constituent has a particle size of 0.5 mm to 10 mm.

16. A fireproofing article as claimed in claim 13 wherein the flexibly compliant constituent has a particle size of 2 mm to 8 mm.

17. A fireproofing article as claimed in claim 13 wherein the flexibly compliant constituent is compressible.

18. A fireproofing article as claimed in claim 13 wherein the flexibly compliant constituent has an uneven surface.

19. A fireproofing article as claimed in claim 13 wherein the flexibly compliant constituent has a rough surface.

20. A fireproofing article as claimed in claim 13 wherein the flexibly compliant constituent is in granular form.

21. A fireproofing article as claimed in claim 13 wherein the flexibly compliant constituent is a granular foam.

22. A fireproofing article as claimed in claim 13 wherein the flexibly compliant constituent is porous.

23. A fireproofing article as claimed in claim 13 wherein said swelling agent is a mixture of swelling agents formulated so that the mixture of swelling agents increases in volume substantially constantly beginning at temperatures of around 150° C.

24. A fireproofing article as claimed in claim 13 wherein said swelling agent is a mixture of swelling agents formulated so that the mixture of swelling agents increases in volume substantially constantly beginning at temperatures of around 200° C.

25. A fireproofing article as claimed in claim 13 wherein said binder is a mixture of binders formulated so that the mixture of binders is successively active at about 100° C. to at least 900° C. and develop their respective binding effect.

* * * * *